United States Patent

[11] 3,572,050

[72] Inventor Edward W. Bottum
 9357 Spencer Road, Brighton, Mich. 48116
[21] Appl. No. 795,827
[22] Filed Feb. 3, 1969
[45] Patented Mar. 23, 1971

[54] REFRIGERATION COMPONENT
 17 Claims, 6 Drawing Figs.
[52] U.S. Cl. .................................................. 62/85,
 62/83, 62/195, 62/474, 62/475
[51] Int. Cl. ................................................ F25b 47/00
[50] Field of Search .......................................... 62/85, 77,
 83, 195, 474, 475

[56] References Cited
 UNITED STATES PATENTS
| | | | |
|---|---|---|---|
| 1,804,836 | 5/1931 | Loranger | 62/474 |
| 2,325,657 | 8/1943 | Burkness | 62/474 |
| 2,365,149 | 12/1944 | Anderson | 62/474 |
| 2,506,806 | 5/1950 | Netzger | 62/474 |
| 2,628,484 | 2/1953 | Ayres | 62/474 |
| 2,758,719 | 8/1956 | Line | 62/474 |
| 2,835,114 | 5/1958 | Shoemaker | 62/474 |
| 3,080,977 | 3/1963 | Jones | 62/474 |
| 3,118,288 | 1/1964 | Small | 62/474 |

FOREIGN PATENTS 561,584  8/1958  Canada ...................... 62/474

Primary Examiner—William J. Wye
Attorney—Whittemore, Hulbert & Belknap

ABSTRACT: The refrigeration component comprises a drier for a refrigeration system. The drier encloses a casing in which a desiccant charge is provided. At least one tubular member is provided on the casing in fluid communication with the casing interior. Preferably, a single tubular member is provided on the casing to form both an inlet to and an outlet from the casing. Threaded fastening means are provided on that tubular member for threading engagement with threaded fastening means on a fitting of a refrigeration line of a refrigeration system to connect the drier to the system for the flow of refrigerant into and out of the drier in response to pressure conditions in the refrigerant line. The tubular member preferably includes a plunger for depression of a valve element within the fitting of the refrigerant line to simultaneously open communication between the drier and the refrigerant line upon screwing of the drier onto the fitting.

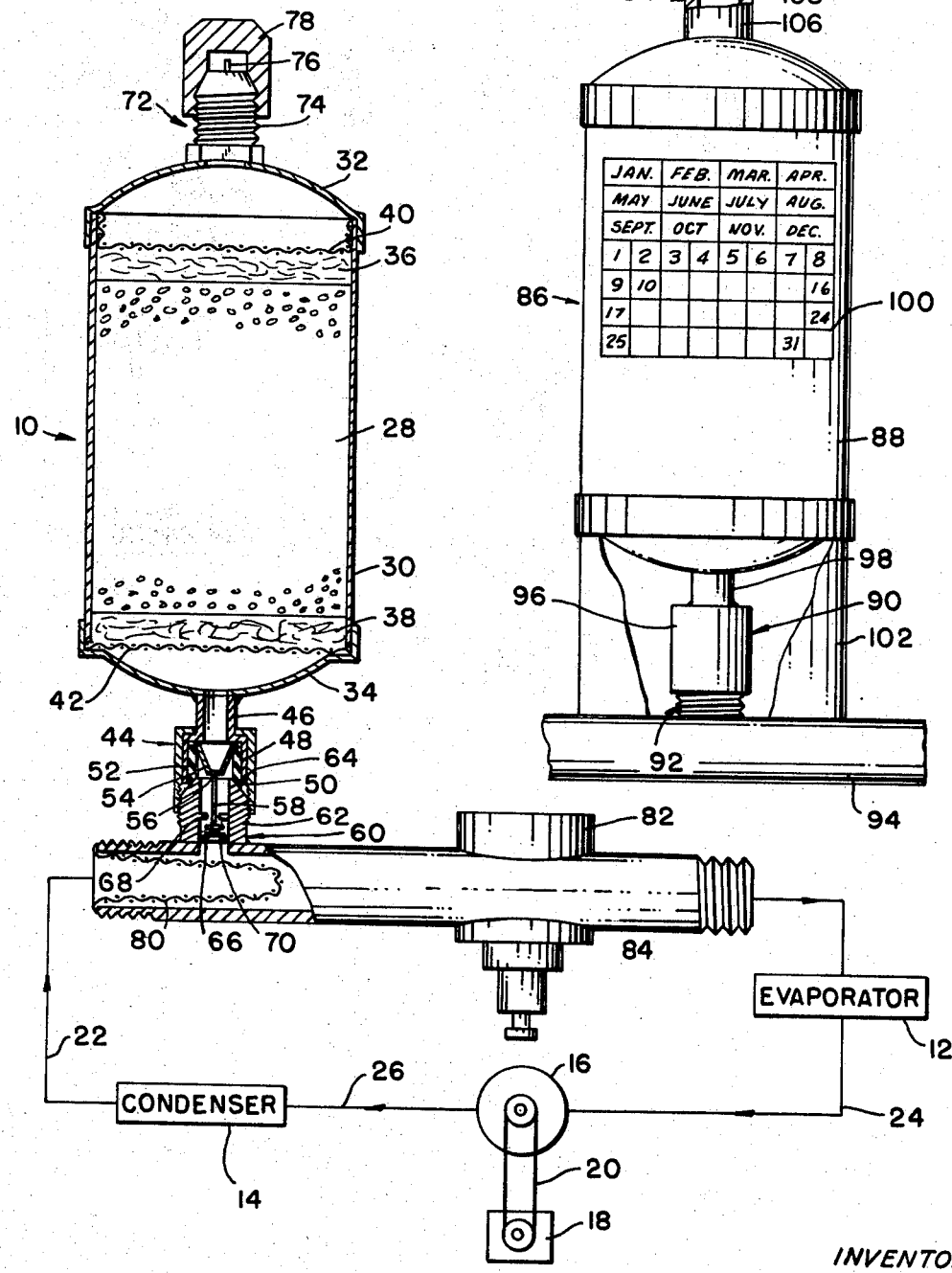

INVENTOR
EDWARD W. BOTTUM

BY Whittemore Hulbert & Belknap

ATTORNEYS

3,572,050

REFRIGERATION COMPONENT

BACKGROUND OF THE INVENTION

The replacement of driers in refrigeration systems has, in the past, required the services of an expert serviceman in the refrigeration field. It has been necessary to disconnect both ends of the drier which, of course, requires pumping the refrigerant charge back into the receiver or entirely losing the charge. It has sometimes been necessary to solder the fittings of the drier upon installation thereof. As will be appreciated, this process is time consuming and expensive.

The problem of replacing driers has been particularly acute in automotive or truck or tractor air-conditioning systems. In such systems, rubber and composition hoses have been used to make the various connections. Such hoses tend to leak and allow moisture to get into the system. This results in a relatively frequent need to replace the drier (which forms part of a receiver-drier component) in order to maintain the refrigerant charge in the desired state of dryness. Further, as a practical matter, it is costly to change the receiver-drier of such systems and it is frequently difficult, because of the large number of different makes and styles of automotive refrigeration systems, to obtain a receiver-drier which is an exact replacement of the original unit. It has been quite often necessary to make extensive alterations to the system in order to fit available receiver-driers thereon. Additionally, usually, when the receiver-drier is changed, the entire refrigerant charge in the system is lost resulting in the need to recharge the system with a new supply of refrigerant.

The present invention offers a relatively simple solution to this problem. In the present invention, a drier is provided which may be simply screwed on to the existing fittings in the refrigeration system. Such existing fittings have valve structures which may be opened and closed by means of the drier structure per se or by mechanical means after the drier has been fastened onto the system. As will be appreciated, such a drier may be readily changed by one inexperienced in refrigeration servicing, such as a service station attendant or the vehicle owner. The drier of the present invention is also capable of incorporating several convenient associated structures which improves the overall use thereof. For example, structure may be provided for attaching gauges or other service tools to the drier. Use of the present invention eliminates soldering or otherwise detaching integral parts of the refrigeration system and obviates the necessity for discharging the refrigerant in the system or pumping the refrigerant charge back into the receiver of the system.

SUMMARY OF THE INVENTION

A drier for a refrigeration system is provided. The drier comprises a casing with a desiccant charge therein. At least one tubular member is provided on the casing in fluid communication with the casing interior. Threaded fastening means are provided on the tubular member for threading engagement with threaded fastening means on a fitting of a refrigerant line of a refrigeration system. Preferably, a single tubular member is provided on the casing to form both an inlet to and an outlet from the casing for the passage of fluid refrigerant into and out of the casing in response to pressure conditions in the refrigeration system. Additionally, the fitting in the refrigerant line is preferably provided with a normally closed valve with a manually depressible valve stem which is depressed simultaneously with screwing the drier onto the fitting to open communication between the refrigerant line and the drier. Various types and styles of desiccants may be utilized within the casing to provide maximum flow of fluid refrigerant through the desiccant. Strainer elements may be provided within the drier casing to prevent movement of foreign particles into the refrigerant stream. Various attachments may be provided on the casing of the drier for application of gauges or sight glasses. An extension may be provided on the casing for mechanical contact with the refrigerant line to prevent breaking of the refrigerant line fitting upon a large mechanical force being applied to the drier.

IN THE DRAWINGS

FIG. 1 is an elevational view in section of one embodiment of a refrigerant drier of the present invention illustratively connected to a refrigeration system which is illustrated schematically;

FIG. 2 is an elevational view of another embodiment of a refrigerant drier connected to a refrigerant line and wherein the drier casing is provided with date indicia for recording the date of installation and a casing extension for abutment against the refrigerant line;

Figure 3:
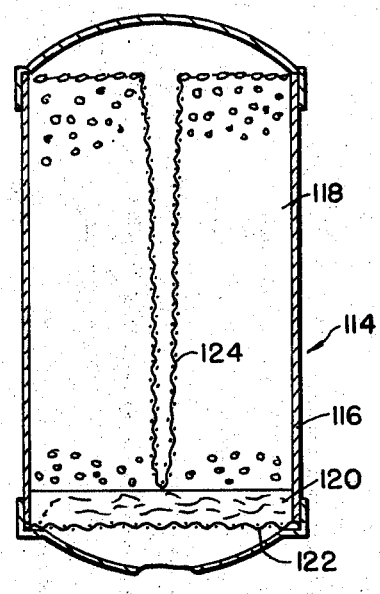
FIG. 3 is an elevational view in section of a further embodiment of a refrigerant drier wherein a folded screen is provided interiorly of the drier to facilitate passage of refrigerant fluid therethrough.

Referring to FIG. 1, the drier 10 is connected to the high side of a refrigeration circuit forming the air-conditioning unit for a vehicle. The refrigeration system comprises the usual evaporator 12, condenser 14 and compressor 16. The compressor 16 is driven directly form the vehicle engine 18 by means of a belt 20. The drier 10 is connected between the condenser 14 and evaporator 12. Warm refrigerant liquid with some gas entrained therein flows from the condenser 14 via the line 22. The drier 10 is connected into the line 22. The line 22 is connected to the inlet of the evaporator 12. The refrigerant is vaporized within the evaporator 12 and is exhausted via line 24 as cold refrigerant gas. The line 24 is connected to the inlet of the compressor 16. The gas is compressed within the compressor and exhausted via line 26 which is connected to the inlet of condenser 14. The compressed gas is condensed to a liquid within the condenser 14 and is exhausted therefrom via line 22 to the inlet of the evaporator 12. The liquid refrigerant is then vaporized within the evaporator to result in a cooling effect to renew the cycle.

As will be appreciated, the vehicle engine 18 is normally operated at different speeds resulting in the compressor being operated at different speeds. Consequently, the head pressure in line 22 is subject to widely differing pressure conditions.

The drier 10 comprises a casing which encloses a desiccant material 28. The casing includes a tubular central portion 30, each end of which is closed by means of a cover 32, 34. The desiccant 28 is in the form of granules. A filter 36, 38 is provided at the upper and lower ends of the desiccant charge. The filters 36, 38 may be fabricated of a material such as glass fiber mat. The filters function to cushion the granules so that they will not crumble into dust as a result of vibrations and other shocks. Additionally, the filters prevent fine particles of foreign material, including desiccant material, form passing through. A strainer 40, 42 is provided on top of the upper filter 36 and below the lower filter 38. The strainers 40, 42 are fabricated of a foraminous material such as wire screen. The strainers function to prevent foreign particles from getting into the system.

A fitting 44 is provided on the lower cover 34 for attachment to the refrigerant line 22. The fitting 44 comprises a tubular section which extends form the cover 34. The tubular section has a first portion 46 of reduced diameter and a second portion 48 of increased diameter. An internally threaded cap 50 is slidingly received on the portion 46. The shoulder formed by the juncture of the portions 46, 48 limits the downward travel of the cap 50. A cylindrical gasket 52 is provided within the portion 48. The lower end of the gasket 52 projects slightly out of the portion 48 when the drier 10 is not mounted on the refrigerant line 22. The gasket 52 is fabricated of a sealing material such as copper, plastic or the like. A plunger 54 is provided within the gasket 52. The plunger 54 is fabricated of a strip of metallic material and has a flattened apex portion 56 for contact with a valve plunger 58 which forms part of a fitting 60 of the line 22. The width of the material of the plunger 54 is less than the diameter of the gasket 52 so that it will not prevent flow of fluid refrigerant thereby.

The fitting 60 comprises an external tubular member 62 which extends from the line 22. The outer end 64 of the member 62 is beveled to make firm, sealing contact with the gasket 52 when the drier 10 is mounted onto the line 22. The valve plunger 54 extends through the member 62. A valve element 66 is carried thereon adjacent to a valve seat 68. A spring 70 constantly urges the valve element 66 to engage the seat 68 and close the tubular member 62.

The fitting 60 as thus described is a conventional SAE flare fitting containing a "Schraeder" type tire valve stem. This fitting forms part of the conventional vehicle refrigeration system and is used for attaching gauges to the system for checking pressures, moisture content and the like. The invention is illustratively secured to such a fitting. However, the drier 10 may be secured to other structures present in conventional vehicle refrigeration systems such as the usual service valve which is provided with a ¼ inch SAE fitting. In such cases, the drier may be screwed onto the existing valve and the service valve thereafter opened with a ratchet wrench for fluid communication with the drier.

As will be appreciated, when the drier 10 is affixed to the line 22 by threading the cap 50 onto the member 62, the plunger 54 depresses the valve plunger 58 thus moving the valve element 66 away from the valve seat 68 and establishing fluid communication between the line 22 and interior of the drier 10. Under relatively high-pressure conditions within the line 22, refrigerant will flow into the drier 10 and through the desiccant 28 where the moisture will be removed. Upon the lowering of the pressure conditions within the line 22, refrigerant gas will flow out of the drier 10 and back into the line 22 to form part of the main stream of the refrigerant charge. In this manner, all of the refrigerant will eventually be subjected to the action of the desiccant although it will take a little longer for the drier to take moisture out of the system than would be the case with a drier wherein the flow of refrigerant passes directly through the desiccant at all times.

A further feature of the drier 10 is the provision of a fitting 72 in the upper cover 32. The fitting 72 includes an externally threaded tubular member 74 and a "Schraeder" type tire valve 76. A protective cap 78 is normally threaded onto the member 74 to prevent inadvertent opening of the valve 76. The fitting 72 has several possible uses. During installation of the drier 10, the valve 76 may be opened by depressing its stem. As refrigerant gas enters the drier 10, air would be forced out of the opposite end of the drier through the fitting 72. This would result in the desired purging of the drier of any air which may be present therein. As will be noted, the drier 10 is mounted in a vertical position which permits purging of the drier 10 of air at any time. However, if the drier were mounted in some other position, refrigerant liquid being heavier than air, purging could not be accomplished except during installation when all the air would be pushed out by the incoming refrigerant before the two fluids separated. The fitting 72 may also be used for the attachment of service gauges, for the pulling of a vacuum, or other service requirements. A dryness indicator may be readily attached to the fitting 72 to show the degree of dryness of the drier, which is an indication of dryness of the entire system.

A strainer 80 is provided in the line 22 slightly upstream of the fitting 60. The strainer 80 functions to remove foreign particles from the stream of refrigerant before the refrigerant enters the fitting 60 where small particles could block the valve opening.

Illustratively, a sight glass 82 and a fitting 84 are provided just downstream of the fitting 60. The fitting 84 may be utilized to mount a fusible plug or fusible pop-off valve as desired to provide for pressure release.

FIG. 2 illustrates another embodiment of a drier 86. The drier 86 includes a casing 88 within which is provided a desiccant as previously described in connection with FIG. 1. A fitting 90 is provided at the lower end of the casing 88 for attachment to a fitting 92 provided in refrigerant line 94. The fittings 90, 92 are similar to this previously described excepting that the cap 96 on fitting 90 is fixedly secured to the tubular member 98 as by welding in order to prevent it from turning during threading of the drier onto the line 94.

A calendar device 100 is provided on the exterior of the casing 88. The calendar device carries indicia of the 12 months and 31 days. Upon installation of the drier 86, the installer will mark the month and day of the month when the installation was made. This will serve as a record and will permit the vehicle owner or service station attendant to know when a new drier should be installed in order to maintain the desired dryness of the system.

The casing 88 has a hollow cylindrical extension 102 at the lower end thereof. The extension 102 abuts against the line 94 upon installation of the drier 86. It is not necessary that the extension 102 abut directly against the line 94, the lower end thereof may be slightly away from the line 94. The function of the extension 102 is to prevent the fitting 92 to be broken off in the event of a severe mechanical blow. As will be appreciated, if there is a severe mechanical blow, the extension 102 will abut against the line 94 thus providing a high degree of mechanical support.

It will also be noted that a fitting 104 is provided at the upper end of the drier 86. The fitting 104 comprises a tubular member 106 which is in fluid communication with the interior of the drier. A paper disc 108 impregnated with a suitable chemical is received on the shoulder adjacent the upper end of the tubular member 106. The chemical in the disc 108 is of the type that will change color in relationship to the amount of moisture to which it is subjected. The disc 108 will thus indicate the degree of moisture present in the drier, which gives an indication of the dryness of the entire refrigerant charge. This will inform the serviceman when it is time to change the drier. A glass disc 110 is provided over the disc 108 to seal the tubular member 106 and provide visibility from the exterior of the drier. The upper ends 112 of the tubular member 106 are turned over to hold the assembly in place.

FIG. 3 illustrates a drier 114 which in many respects is similar to the drier 10 of FIG. 1. In FIG. 3, the drier 114 includes a casing 116 which encloses granular desiccant 118. A filter 120 and strainer 122 are provided at the lower end of the casing. A fitting, such as the fitting 44 of FIG. 1, is provided at the lower end of the casing (not shown).

As will be noted, there is no fitting at the top of the casing similar to the fitting 72 provided in the FIG. 1 embodiment. As a consequence, it is not necessary to provide a strainer and filter at the top portion of the desiccant charge because there is no danger of refrigerant in the upper end of the drier becoming contaminated with foreign particles from the ambient atmosphere.

A folded-over screen 124 is provided centrally of the desiccant charge 118. The screen 124 extends diametrically across the interior of the casing 116. The screen 124 extends from the filter 120 to the upper surface of the desiccant charge. The function of the screen 124 is to provide a central passageway for the flow of refrigerant through the drier to facilitate movement through the entire charge of desiccant. As will be appreciated, refrigerant will flow upwardly from the bottom of the desiccant charge and also laterally through the openings in the screen 124 through the desiccant charge throughout the entire depth of the charge.

Figure 4:
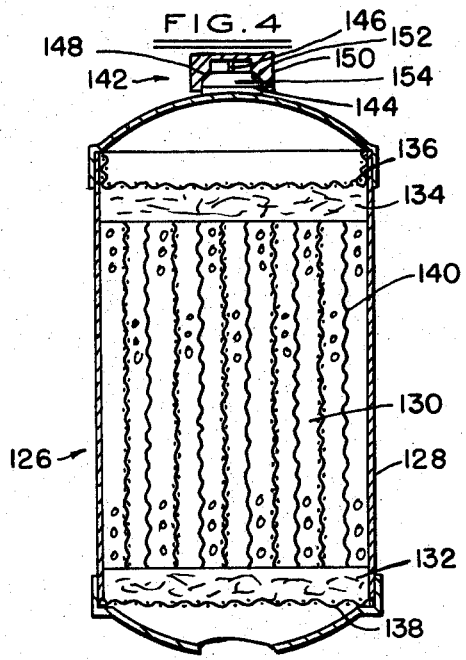
FIG. 4 is an elevational view in section of another embodiment of the invention wherein tubular passages formed of foraminous material are provided interiorly of the drier to facilitate passage of refrigerant fluid.

FIG. 4 illustrates an embodiment somewhat similar to the FIG. 3 embodiment in terms of the open passageway means through the desiccant charge. In FIG. 4 the drier 126 comprises a casing 128 having a desiccant charge 130. A filter 132, 134 is provided at the upper and lower surfaces of the desiccant charge and a strainer screen 136, 138 is provided above and below the filters. The usual fitting (not shown) is provided at the lower end of the casing 128 for attachment to a refrigerant line. A plurality of spaced-apart, longitudinally extending tubular foraminous members 140 are provided in the desiccant charge. The tubular members 140 are evenly spaced through the cross section of the desiccant charge. As in the case of the FIG. 3 embodiment, refrigerant passes upwardly through the tubular members 140 and laterally through the openings therein through the desiccant charge to assure usage of the entire desiccant charge.

A fitting 142 is provided at the top of the casing 128. The fitting 142 includes an upstanding externally threaded tubular member 144 which communicates with the interior of the casing 128. A "Schraeder" type tire valve 146 is provided within the tubular member 144 as previously described. The upper end 148 of the tubular member 144 is flared. An internally threaded cap 150 is received on the tubular member 144. The cap 150 has an internal flared shoulder 152 which seats on the flared end 148 to seal the tubular member 144 from the atmosphere. Screwing of the cap 150 onto the tubular member 144 as illustrated in FIG. 4 results in the stem of the valve 146 being depressed to open the valve. A small opening 154 is provided in the sidewall of the cap 150. When the cap 150 is threaded a slight distance outwardly from the tubular member 144, the opening 154 is positioned above the upper end of the tubular member 144. The valve 146 is, at this time, still open. The drier 126 may be purged of any air therein by unscrewing the cap 150 sufficiently to raise the opening 154 above the upper end of the tubular member 144. When the cap 150 is entirely unscrewed from the tubular member 144, the valve 146 closes in the usual manner.

Figure 5:
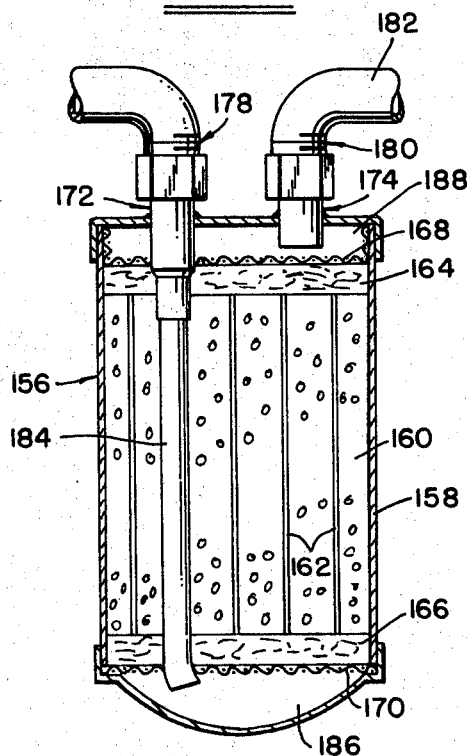
FIG. 5 is an elevational view in section of another embodiment of the invention wherein a separate inlet and a separate outlet are provided for the drier.

FIG. 5 illustrates a drier 156 of somewhat different configuration than those previously described. In FIG. 5, the drier 156 comprises a casing 158 which encloses a desiccant charge 160. The desiccant charge 160 is in molded block form. However, longitudinally extending passageways 162 are provided in the block desiccant 160. The passageways 162 are spaced apart over the cross section of the charge 160 and extend from end-to-end thereof. The passageways 162 assure contact of the refrigerant with the desiccant material.

A filter 142, 166 is provided at the upper and lower ends of the desiccant charge. A strainer 168, 170 is provided above and below each of the filters 164, 166. The provision of the filters and strainers is not as critical in the FIG. 5 embodiment as it previously was because the desiccant does not tend to crumble and form small particles which could become entrained in the refrigerant.

An inlet fitting 172 and an outlet fitting 174 are provided in the upper end of the casing 158. Both the inlet fitting and the outlet fitting have the structure illustrated for the fitting 44 of the FIG. 1 embodiment. The fittings 172, 174 are connected to fittings 178, 180 of a discontinuous refrigerant line 182. The fitting 178, 180 have the structure described in connection with the refrigerant line fitting 60 of FIG. 1.

The inlet fitting 172 has a tubular extension 184 which extends entirely through the desiccant charge 160 and terminates within the chamber 186 beneath the desiccant charge. The outlet fitting 174 terminates within the chamber 188 above the desiccant charge.

In operation, incoming refrigerant flows into the drier 156 via the inlet fitting 172 and extension 184. The incoming refrigerant fills the chamber 186 and rises through the passageways 162 to thereby contact the desiccant. After the refrigerant has passed through the desiccant, it fills chamber 188 and ultimately flows out of the outlet fitting 174 and thence through the refrigeration system.

As will be appreciated, the drier 156 does not depend for its operation upon changes of pressure in the refrigeration system. All of the refrigerant must flow through the drier. Such a drier operates more rapidly than one which depends upon variations in system pressure. It is, however, not always desireable to have such a drier in operation because it has a tendency to form a pressure restriction in the system. Additionally, such a drier necessitates a pair of fittings 172, 174 on the drier and a pair of fittings 178, 180 in the refrigerant line. This adds to the cost of the entire construction and, when used in a conventional automotive system, requires a modification of the system. However, the drier 156 does possess the advantage of being easily attached and detached from the refrigeration system without requiring extensive work on the part of the serviceman.

Figure 6:
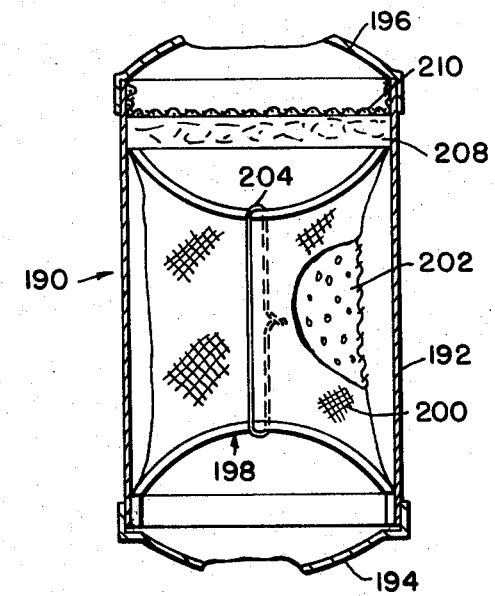
FIG. 6 is an elevational view in section of another embodiment of the invention wherein a desiccant bag is provided within the drier.

FIG. 6 illustrates an embodiment which in most respects is similar to the FIG. 1 showing. In FIG. 6, the drier 190 comprises a casing 192 having an inlet fitting at the lower end 194 and a service fitting at the upper end 196 (not shown) of the same construction as the fittings 44 and 72 described in connection with FIG. 1.

A desiccant charge comprises a bag 198, the covering of which is formed of a foraminous material 200 which functions as a strainer. Granular desiccant material 202 is contained within the bag. A wire closure member 204 is provided to retain the shape of the bag. The use of such bags is advantageous in that they may be easily replaced by removal of the lower casing closure member 194. Additionally, such bags do not result in releasing fine particles of desiccant which may become entrained in the refrigerant.

A filter 208 and strainer 210 are provided above the desiccant bag 198. The function of the filter 208 and strainer 210 is to prevent ingress of foreign particles via the upper fitting. If the upper fitting were eliminated, as in FIG. 3, there would not be a need for the filter 208 or strainer 210.

In the various embodiments which have been disclosed, it has been indicated that the drier is preferably mounted on the high side of the refrigeration system. In automotive air-conditioning systems, the head pressure on the high side may be considered to be constantly changing with the result that all the embodiments, excepting FIG. 5 embodiment, will be subject to changing pressure thus resulting in movement of refrigerant into and out of the drier. The drier may also be attached to the low side of the system, adjacent to the compressor, where it will be subjected to what is tantamount to constantly varying suction pressures causing gas and liquid to enter and leave the drier and thereby dry the refrigerant charge. The drier may also be utilized in refrigeration systems other than automotive. In such systems, which have relatively constant head pressure, there is a relatively small flow into and out of the drier. However, over an extensive period of time, there are variations in pressure and refrigerant will ultimately flow into and out of the drier to result in drying the refrigerant charge in the system.

When the driers of the present invention are utilized in an automotive air-conditioning system, the refrigerant charge will be dried over a period of time even though the old existing receiver-drier of the system is not removed. Use of the drier in a new automotive air-conditioning system could result, of course, in elimination of the use of the receiver-drier and associated sight glass assembly. In instances where the refrigerant charge has relatively high degree of moisture therein, it may be necessary to use more than one of the driers to arrive at the ultimate desired degree of dryness.

Purging of the drier may be accomplished without resort to a separate valve such as the valve 76 described in connection with FIG. 1. A device without such a valve, such as the drier 114 of FIG. 3, may be purged by means of the fitting at the lower end of the drier casing. For example, referring to FIG. 1, the drier 10 may be purged without opening the valve 76 by attaching and removing the drier from the fitting 60.

A threaded plug is normally threaded into the drier fitting 44 to seal the drier from atmosphere during storage of the drier. This plug is removed and the fitting 44 is threadingly engaged with the fitting 60. This depresses the valve element 66 to open the valve. Refrigerant gas under pressure than flows into the drier. The fitting 44 is then disengaged from the fitting 60. Gas in the drier, being at greater than atmospheric pressure, will then flow out of the drier into the atmosphere. The refrigerant gas will carry with it air which is in the drier to thereby purge the drier. The process may be repeated to minimize the amount of air in the drier. After the drier has been purged, it is permanently mounted on the refrigerant line.

In describing the various embodiments of the fittings, it has been indicated that a "Schraeder" type tire valve is used. However, other valve types may be utilized in accordance with the invention. Additionally, the cap member on the drier fitting, such as the cap member 50 in FIG. 1, has been described as being internally threaded. However, an externally threaded member could also be used.

I claim:

1. A drier for a refrigeration system comprising a casing, a desiccant charge within the casing, at least one tubular member on the casing in fluid communication with the casing interior, threaded fastening means on the tubular member for threading fluidtight engagement with threaded fastening means on a fitting of a refrigerant line of a refrigeration system and plunger means within said tubular member for contacting and opening a valve element in the fitting on the refrigerant line upon threading of the drier onto said fitting.

2. A drier as defined in claim 1, and further characterized in the provision of a pair of tubular members on the casing, one of said tubular members serving as an inlet into the drier, the other of said tubular members serving as an outlet from the drier.

3. A drier as defined in claim 1, and further characterized in that only one tubular member is provided on the casing, said tubular member forming both an inlet and an outlet for refrigerant to pass into and out of the drier in response to pressure conditions in the refrigeration system.

4. A drier for a refrigeration system comprising a a desiccant charge within the casing, a single tubular member on the casing in fluid communication with the casing interior and forming both an inlet to an outlet from the casing for passage of fluid refrigerant material into and out of the casing in response to pressure conditions in the refrigeration system, means on the tubular member for fluidtight engagement with means on a fitting of a refrigerant line of a refrigeration system.

5. The drier as defined in claim 4, and further characterized in the provision of plunger means within said tubular member for contacting and opening a valve element in the fitting on the refrigerant line upon threading of the drier onto said fitting.

6. A drier as defined in claim 4, and further characterized in the provision of a second tubular member on the casing, said second tubular member and manually depressible for opening the valve, and a detachable cap fastened to the outer end of said second tubular member in fluidtight engagement therewith.

7. A drier as defined in claim 6, and further characterized in that said cap normally depresses said plunger to open said valve when the cap is detachably fastened to said second tubular element, said cap having sidewall means overlapping said second tubular member when said cap is in place, said sidewall means having opening means therein in alignment with said second tubular member when said cap is fully mounted on said second tubular member, said opening means being located on said cap wall means in a position to be moved slightly beyond the end of said second tubular member upon partial removal of said cap with said cap with said valve remaining open to provide fluid passage means to the ambient atmosphere for purging the drier.

8. A drier as defined in claim 4, and further characterized in the provision of a plurality of longitudinally extending spaced-apart tubular members in said desiccant charge extending substantially from end-to-end thereof, said tubular members being fabricated of a foraminous material whereby fluid refrigerant material may flow longitudinally thereof and laterally therethrough into the desiccant charge.

9. A drier as defined in claim 4, and further characterized in that said desiccant charge comprises a relatively solid block of desiccant material, said block of desiccant material having a plurality of longitudinally extending, spaced-apart passageways therethrough for the flow of fluid refrigerant.

10. A drier as defined in claim 4, and further characterized in the provision of tubular extension means projecting from the casing around the tubular member for substantially abutting engagement with the outer surface of the refrigerant line of a refrigeration system upon engagement of the tubular member with said fitting of the refrigerant line.

11. A drier as defined in claim 6, and further characterized in the provision of a strainer at each end of the desiccant charge extending across the interior of the casing.

12. A drier as defined in claim 5, and further characterized in the provision of a strainer interposed between the desiccant charge and the tubular member and extending across the interior diameter of the casing.

13. In combination, a drier for a refrigeration system comprising a casing, a desiccant charge within the casing, a single tubular member on the casing in fluid communication with the casing interior forming both an inlet and an outlet for the passage of fluid refrigerant into and out of the casing interior in response to pressure conditions in the refrigeration system, threaded fastening means on the tubular member, a refrigeration line, said refrigeration line having a fitting including threaded fastening means in threaded fluidtight engagement with the threaded fastening means on said tubular member, said fitting including a tubular member in fluid communication with the interior of the refrigerant line for the flow of refrigerant from the refrigerant line into and out of the drier in response to pressure conditions in the refrigerant line.

14. The combination defined in claim 13 and further characterized in the provision of a normally closed valve in said fitting, said valve having an outwardly projecting plunger element manually depressible to open the valve, and additional plunger means within said tubular member depressing said valve plunger means to open the valve for fluid communication between the refrigerant line and the drier.

15. The method of subjecting fluid refrigerant in a refrigeration system to a desiccant comprising attaching a casing containing a desiccant to the refrigerant line in fluid communication therewith by means of a single fluid passageway, and then flowing refrigerant into the casing upon a rise of pressure in the refrigeration system and flowing refrigerant out of the casing upon a fall of pressure within the refrigeration system.

16. The method as defined in claim 15, and further characterized in that said fluid passageway is attached to the refrigerant line while simultaneously opening a valve in the refrigerant line for fluid communication between the refrigerant line and the casing.

17. The method as defined in claim 16, and further characterized in that the casing is purged of foreign gases before said attachment by the steps of first temporarily attaching the casing to the refrigerant line then flowing refrigerant fluid under pressure into the casing, then removing the casing from the refrigerant line, then exhausting the casing to the ambient atmosphere to thereby expel a portion of the refrigerant fluid and said foreign gases to atmosphere, and then reattaching the casing to the refrigerant line.